(12) United States Patent
Kuznetsov et al.

(10) Patent No.: US 8,010,891 B2
(45) Date of Patent: Aug. 30, 2011

(54) COORDINATED XML DATA PARSING AND PROCESSING FROM WITHIN SEPARATE COMPUTING PROCESSES

(75) Inventors: Eugene Kuznetsov, Cambridge, MA (US); Alexandre Polozoff, Bloomington, IL (US); Richard E. Salz, Reading, MA (US); Robert Woolf, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1062 days.

(21) Appl. No.: 11/832,915

(22) Filed: Aug. 2, 2007

(65) Prior Publication Data

US 2009/0037807 A1 Feb. 5, 2009

(51) Int. Cl.
*G06F 17/00* (2006.01)
(52) U.S. Cl. ................. 715/237; 715/234; 715/255
(58) Field of Classification Search .......... 715/234, 715/236–239, 243, 255–256
See application file for complete search history.

(56) References Cited

U.S. PATENT DOCUMENTS

| 6,898,604 | B1* | 5/2005 | Ballinger et al. | ..................... 1/1 |
| 7,178,150 | B1* | 2/2007 | Ahmad et al. | ................ 719/313 |
| 7,363,891 | B2* | 4/2008 | Shimojo et al. | ............ 123/90.15 |
| 7,386,835 | B1* | 6/2008 | Desai et al. | .................... 717/117 |
| 2004/0123236 | A1* | 6/2004 | Cheung | ......................... 715/513 |
| 2004/0254905 | A1* | 12/2004 | Tiku | ................................ 706/55 |
| 2006/0046691 | A1* | 3/2006 | Nishio | .......................... 455/410 |
| 2007/0266380 | A1 | 11/2007 | Creamer et al. | |
| 2010/0037130 | A1* | 2/2010 | Jakubowski | ................. 715/235 |

* cited by examiner

*Primary Examiner* — Thu V Huynh
(74) *Attorney, Agent, or Firm* — Steven M. Greenberg, Esq.; Carey, Rodriguez, Greenberg & Paul

(57) ABSTRACT

Embodiments of the present invention address deficiencies of the art in respect to extensible markup language (XML) data processing and provide a novel and non-obvious method, system and computer program product for inter-device transfer of parsed XML documents. In one embodiment of the invention, a markup serialization method can be provided. The method can include receiving a request in a second computing process for offloaded parsing of markup from an application in a first computing process, retrieving markup from the application, parsing the markup in the second computing process to produce a serialized data object for the markup, placing the serialized data object into shared memory for the application, and returning a reference to the serialized data to the application.

12 Claims, 2 Drawing Sheets

COORDINATED XML DATA PARSING AND PROCESSING FROM WITHIN SEPARATE COMPUTING PROCESSES

BACKGROUND OF THE INVENTION

1. Field of the Invention

The present invention relates to Extensible Markup Language (XML) document parsing and processing, and more particularly to the use of separate processing appliances to perform XML parsing and XML processing.

2. Description of the Related Art

The Extensible Markup Language (XML) is a markup language specification widely credited with improving the functionality of the World Wide Web by making data self-describing, thereby allowing the identification of information in a more accurate, flexible, and adaptable way. XML is referred to as "extensible" because XML is not a fixed format like the hypertext markup language (HTML) which is a single, predefined markup language. Rather, XML is a meta-language that describes other languages. As such, XML allows for the design of other markup languages for limitless different types of documents. XML can act as a meta-language because XML is written according to the standardized general markup language (SGML)—the international standard meta-language for text document markup.

For an XML document to be acceptable to an end user, the XML document must conform to a predefined structure. An XML schema is an XML-based representation of the structure of an XML document. Through its support for data types and namespaces, an XML schema has the potential to describe the expected structure for XML elements and attributes. As such, prior to an XML document being utilized, the XML document can be validated to ensure that the XML document conforms to its corresponding XML schema.

Validation can involve the parsing of an XML document and the construction of a document object model (DOM) tree for the XML document. Once a DOM tree has been constructed, the nodes of the DOM tree can be traversed in order to confirm that the structure of the XML document conforms to a referenced schema. As it will be apparent then to the skilled artisan, the parsing process can be resource consuming in nature. To address the resource consumptive nature of XML document parsing, XML processing appliances have been used to perform XML document parsing separately from applications requiring XML document processing.

Where a separate XML processing appliance provides XML document parsing, a client application can call an application programming interface (API) that forwards the XML document to the XML processing appliance for parsing and, optionally, schema validation. The XML processing appliance can perform parsing on the received XML document and return a parsed result to the application. As a result, significant performance advantages can be achieved by offloading the XML parsing to the XML processing appliance. Yet, significant overhead remains in the packaging and communication of the XML document between the application and the XML processing appliance, and communication of the resulting serialized data between the appliance and the application.

BRIEF SUMMARY OF THE INVENTION

Embodiments of the present invention address deficiencies of the art in respect to XML data processing and provide a novel and non-obvious method, system and computer program product for inter-device transfer of parsed XML documents. In one embodiment of the invention, a markup serialization method can be provided. The method can include receiving a request in a second computing process for offloaded parsing of markup from an application in a first computing process, retrieving markup from the application, parsing the markup in the second computing process to produce a serialized data object for the markup, placing the serialized data object into shared memory for the application, and returning a reference to the serialized data to the application.

In one aspect of the embodiment, retrieving markup from the application can include receiving a pointer to the markup in the shared memory, and retrieving the markup from shared memory at an address associated with the pointer. In another aspect of the embodiment, returning a reference to the serialized data to the application can include rewriting the request with a pointer to the serialized data object in the shared memory and returning the request to the application. In yet another aspect of the embodiment, returning a reference to the serialized data to the application can include rewriting the request with a pointer to a relocatable form of the serialized data object in the shared memory and returning the request to the application.

In another embodiment of the invention, a parsed markup serialization data processing system can be provided. The system can include an application disposed in a first computing process, a markup parser disposed in a second computing process, shared memory for the application, and a binder communicatively coupled both to the application and the parser and disposed in the second computing process. The binder can include program code enabled to receive a request for offloaded parsing of markup from the application, to retrieve markup from the application, to pass the markup to the parser for parsing into a serialized data object, to place the serialized data object into the shared memory, and to return a reference to the serialized data object to the application. Optionally, the markup can include XML markup.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for inter-device transfer of serialized parsed XML markup. In accordance with an embodiment of the present invention, XML markup provided by an application in a request from a primary computing process can be parsed and serialized into a serialized data object in a secondary computing process. Once serialized, the data object can be placed in shared memory relative to the computing processes and a memory pointer to the data object can be returned to the consuming application in the primary computing process by replacing the XML markup in the request with the memory pointer. The consumer application, in turn can access the serialized data object as if the data object had been serialized within the primary computing process rather than in the secondary computing process.

Figure 1:
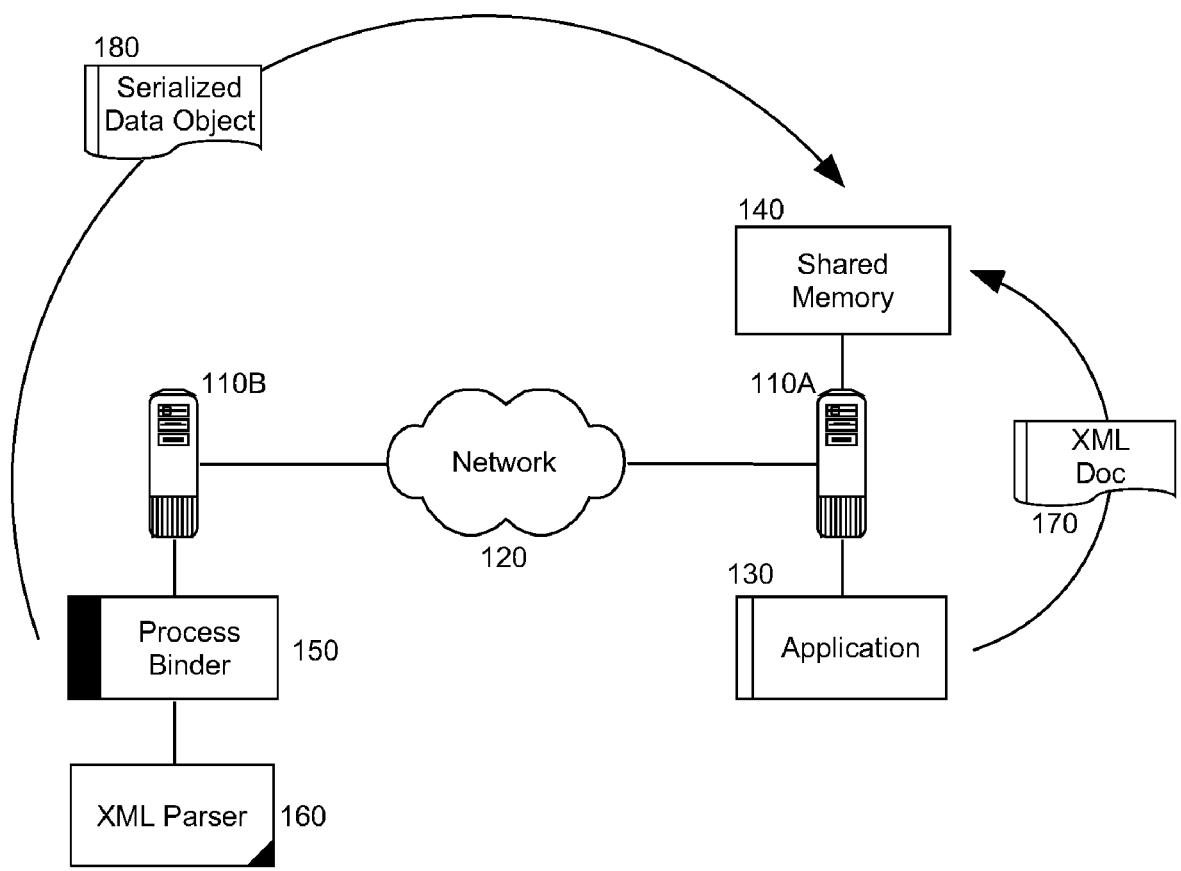
FIG. 1 is a schematic illustration of an XML markup data processing and consumption system for inter-device transfer of parsed XML markup; and, FIG. 2 is a flow chart illustrating a process for inter-device transfer of parsed XML markup.

In illustration, FIG. 1 is a schematic illustration of an XML data processing and consumption system for inter-device transfer of parsed XML markup. The system can include separate primary and secondary computing processes 110A, 110B coupled to one over a data communications network channel. In this regard, the separate primary and secondary computing processes 110A, 110B can subsist in a single host computing platform such that the data communications network channel 120 is TCP/IP inter-process communications. Alternatively, the separate primary and secondary computing processes 110A, 110B can subsist in a different host computing platforms such that the data communications network channel 120 is hardware bus coupling both computing platforms. As yet another alternative, the separate primary and secondary computing processes 110A, 110B can subsist in different host computing platforms separated over a computer communications network such that the data communications network channel 120 is a traditional network communications channel.

The primary computing process 110A can support the operation of an application 130 configured to consume XML markup. The secondary computing process 110B in turn can support the operation of an XML parser 160 and can be bound to the primary computing process 110A by way of process binder 150. The process binder 150 can include program code enabled to interact with both the application 130 and shared memory 140 utilized by the application 130. In this regard, the program code for the process binder 150 further can be enabled to maintain access to the shared memory 140 through the primary process 110A in order to read from and write to the shared memory 140 in behalf of the XML parser 160. The program code for the process binder 150 yet further can be enabled to communicate with the application 130 in order to receive a request for XML parsing of XML markup from the application 130.

In operation, the application 130 can request offloaded XML parsing of XML markup 170. The XML markup 170 can be placed in shared memory 140 where the XML markup 170 can be accessed by the program code of the process binder 150. The program code of the process binder 150, upon receiving the request, can retrieve a pointer to the XML markup 170 in the shared memory 140 and can provide the XML markup 170 to the XML parser 160 for parsing. The XML parser 160, in turn, can parse the XML markup 170 to produce a serialized data object 180. Thereafter, the program code of the process binder 150 can place the serialized data object 180 into shared memory 140. Finally, the program code of the process binder 150 can rewrite the request to replace the XML markup 170 with a pointer to the serialized data object 180 in shared memory 140 and the request can be returned to the application 130 such that the application 130 can utilize the serialized data object 180 directly as programmatic data in the application 130.

Figure 2:
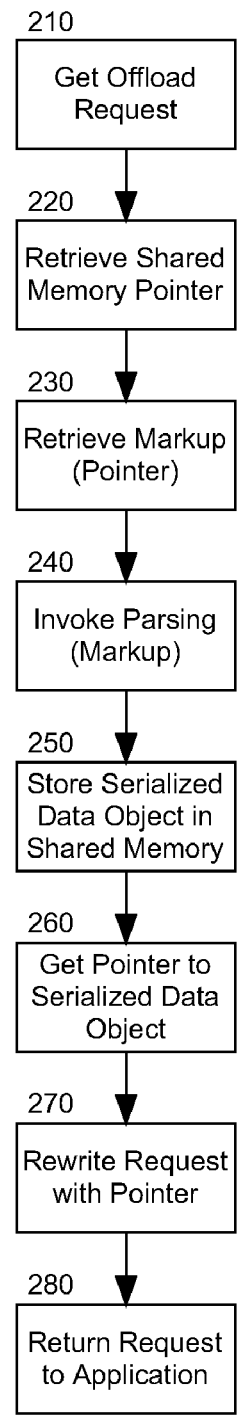

In further illustration, FIG. 2 is a flow chart illustrating a process for inter-device transfer of parsed XML markup. Beginning in block 210, an offload request can be received to offload XML markup parsing from an application in a first computing process. In block 220, the XML markup in the request can be placed in shared memory and a pointer to the shared memory can be retrieved in a second computing process. In block 230, the XML markup in shared memory can be retrieved at the memory address referenced by the pointer and in block 240, an XML parser can be invoked to parse the XML markup retrieved from shared memory.

The XML parser can return a serialized data object representative of the XML markup and in block 250, the serialized data object can be stored in the shared memory. Once stored, a pointer to the serialized data object can be determined in block 260 and in block 270, the offload request can be re-written to replace the XML markup with the pointer to the serialized data object. For example, the pseudo-request:

```
<soap:Envelope xmlns:soap='...'>
    <soap:Header>
        <wsrx:Sequence>
            <wsrx:Id>1234</wsrx:Id>
            <wsrx:MsgNum>7</wsrx:MsgNum>
        </wsrx:Sequence>
    </soap:Header>
    <soap:Body>
        <Purchase xmlns='...'>
            <ShipTo>
                <Name>John Doe</Name>
                <Company>ABC Company</Company>
                <Street>10 Elm Street</Street>
                <City>Anyplace</City>
                <State>Anystate</State>
                <Zip>12345</Zip>
            </ShipTo>
            <Items>
                <Book1>...</Book1>
                <Book2>...</Book2>
            </Items>
        </Purchase>
    </soap:Body>
</soap:Envelope>
``` can be re-written to

```
<soap:Envelope xmlns:soap='...'>
    <soap:Header>
        <wsrx:Sequence>
            <wsrx:Id>1234</wsrx:Id>
            <wsrx:MsgNum>7</wsrx:MsgNum>
        </wsrx:Sequence>
    </soap:Header>
    <soap:Body>
        <Purchase xmlns='...'>
            <ShipTo>
                <memory pointer=0x0f389891/>
            </ShipTo>
            <Items>
                <memory pointer=0x0f324911/>
                <memory pointer=0x0f324810/>
            </Items>
        </Purchase>
    </soap:Body>
</soap:Envelope>
```

Finally, in block 280 the re-written request can be returned to the application where the application can access the serialized data objects directly as programmatic data.

As an alternative, in lieu of providing a pointer to a memory address in shared memory to the serialized data object, the serialized data object can be defined as a relocatable binary object utilizing a representation header in the request. In the alternative circumstance, the re-written request can appear, for example, as a MIME message using MTOP/XOP representation headers, such as

```
Content-Type: multipart/related; spearate='xyzzy'
--xyzzy
Content-Type: applciation/xml+soap
<soap:Envelope xmlns:soap='...'>
    <soap:Header>
        <soap:rep id='cid:p1'/>
    </soap:Header>
    <soap:Body>
        <Purchase xmlns='...'>
            <ShipTo>
                <soap:rep id='cid:i1'/>
            </ShipTo>
            <Items>
                <soap:rep id='cid:i2'/>
                <soap:rep id='cid:i3'/>
            </Items>
        </Purchase>
    </soap:Body>
</soap:Envelope>
--xyzzy
Content-Type: application/x-memory-representation
Content-Id: p1
[serialized binary format of object]
--xyzzy
Content-Type: application/x-memory-representation
Content-Id: i1
[serialized binary format of object]
-xyzzy
Content-Type: application/x-memory-representation
Content-Id: i2
[serialized binary format of object]
-xyzzy
Content-Type: application/x-memory-representation
Content-Id: i3
[serialized binary format of object]
-xyzzy
```

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A markup serialization method comprising:
   receiving a request in a second computing process for offloaded parsing of markup from an application in a first computing process;
   retrieving markup from the application;
   parsing the markup in the second computing process to produce a serialized data object for the markup;
   placing the serialized data object into shared memory for the application; and,
   returning a reference to the serialized data object to the application, including:
      rewriting the request with a pointer to the serialized data object in the shared memory or to a relocatable form of the serialized data object in the shared memory; and
      returning the rewritten request to the application.

2. The method of claim 1, wherein
   the retrieving the markup comprises:
   receiving a pointer to the markup in the shared memory; and,
   retrieving the markup from shared memory at an address associated with the pointer.

3. The method of claim 1, wherein
   the retrieving the markup is performed by the second computing processing.

4. The method of claim 1, wherein
   the placing the serialized data object is performed by the second computing processing.

5. The method of claim 1, wherein
   the returning the reference is performed by the second computing processing.

6. A parsed markup serialization data processing system comprising:
   an application disposed in a first computing process;
   a markup parser disposed in a second computing process;
   shared memory for the application; and
   a binder communicatively coupled both to the application and the parser and disposed in the second computing process, the binder comprises computer usable program code, which when executed by the binder, causes the binder to
      receive a request for offloaded parsing of markup from the application,
      retrieve the markup from the application,
      pass the markup to the parser for parsing into a serialized data object,
      place the serialized data object into the shared memory, and
   return a reference to the serialized data object to the application, wherein the reference is a pointer to the serialized data object in the shared memory or to a relocatable form of the serialized data object in the shared memory.

7. The system of claim 6, wherein
the markup is extensible markup language (XML) markup.

8. A computer program product comprising a computer readable storage device having stored therein computer readable program code for markup serialization, the computer readable program code, which when executed by a computer hardware system, causes the computer hardware system to perform receiving a request in a second computing process for offloaded parsing of markup from an application in a first computing process;

retrieving the markup from the application;

parsing the markup in the second computing process to produce a serialized data object for the markup;

placing the serialized data object into shared memory for the application; and returning a reference to the serialized data to the application, including:

rewriting the request with a pointer to the serialized data object in the shared memory or to a relocatable form of the serialized data object in the shared memory; and returning the rewritten request to the application.

9. The computer program product of claim 8, wherein
the placing the serialized data object is performed by the second computing processing.

10. The computer program product of claim 8, wherein
the retrieving the markup is performed by the second computing processing.

11. The computer program product of claim 8, wherein retrieving the markup comprises:

receiving a pointer to the markup in the shared memory; and retrieving the markup from shared memory at an address associated with the pointer.

12. The computer program product of claim 8, wherein
the returning the reference is performed by the second computing processing.

\* \* \* \* \*